United States Patent [19]

Ide

[11] Patent Number: 5,384,830
[45] Date of Patent: Jan. 24, 1995

[54] APPARATUS WITH SELECTIVE FORWARDING OF FACSIMILE AND VOICE COMMUNICATIONS

[75] Inventor: Hisashi Ide, Higashihiroshima, Japan

[73] Assignee: Sharp Kabushiki Kaisha, Osaka, Japan

[21] Appl. No.: 897,446

[22] Filed: Jun. 9, 1992

[30] Foreign Application Priority Data

Jun. 12, 1991 [JP] Japan .................. 3-140396

[51] Int. Cl.⁶ ................... H04M 1/64; H04M 11/00
[52] U.S. Cl. .......................... 379/67; 379/88; 379/100; 379/212; 358/402; 358/403; 358/440
[58] Field of Search .............. 379/67, 88, 100, 211, 379/212; 358/402, 403, 407, 439, 440

[56] References Cited

U.S. PATENT DOCUMENTS

| 4,837,798 | 6/1989 | Cohen et al. | 379/88 |
| 4,920,427 | 4/1990 | Hirata | 379/100 |
| 5,008,926 | 4/1991 | Misholi | 379/94 |
| 5,224,156 | 6/1993 | Fuller et al. | 379/100 |

FOREIGN PATENT DOCUMENTS

| 0347155 | 12/1989 | European Pat. Off. . |
| 2-41073 | 2/1990 | Japan . |
| 2211698 | 7/1969 | United Kingdom . |
| 2170075 | 7/1986 | United Kingdom . |
| 2231757 | 11/1990 | United Kingdom . |
| WO90/04299 | 4/1990 | WIPO . |
| WO91/03115 | 3/1991 | WIPO . |

OTHER PUBLICATIONS

European Search Report, *The Hague*, completed Sep. 1, 1993.
Patent Abstracts of Japan, vol. 14, No. 112, (E-897) 28 Feb. 1990 and JP-A-1311757, Dec. 15, 1989.
patent Abstracts of Japan, vol. 15, No. 304 (E-1096)4, Aug. 1991 and JP-A-3108951, May 9, 1991.
EPO Search Report.
*Patent Abstracts of Japan*, vol. 14, No. 394 (E-969) 24 Aug. 1990 & JPA2146866 (Sharp Corp.) 6 Jun. 1990.

*Primary Examiner*—James L. Dwyer
*Assistant Examiner*—Fan Tsang
*Attorney, Agent, or Firm*—Nixon & Vanderhye

[57] ABSTRACT

A facsimile apparatus capable of notifying the user of the details of image signal storing contents without restricting the selection of the transfer destination. An image signal memory stores image signals, and a list text creation section creates an image storing content list, a tabulated listing of the stored image signals. A list text transfer section transmits the image storing content list created by the list text creation section to a designated image list transfer destination number stored in a transfer destination terminal number memory.

6 Claims, 7 Drawing Sheets

Fig. 2

| CALLING SUBSCRIBER'S TERMINAL NUMBER | TRANSFER DESTINATION TERMINAL NUMBER | |
|---|---|---|
| — | X1 | —30 |
| — | X2 | —31 |
| — | X3 | —32 |
| a1 | A | |
| a2 | A | |
| ⋮ | ⋮ | |
| an | A | |
| b1 | B | |
| b2 | B | |
| ⋮ | ⋮ | |
| ⋮ | ⋮ | |

APPARATUS WITH SELECTIVE FORWARDING OF FACSIMILE AND VOICE COMMUNICATIONS

BACKGROUND OF THE INVENTION

1. Field of the Invention

The present invention relates to a facsimile apparatus having an image signal storing function, and more particularly to a facsimile apparatus capable of transmitting a list of image signal storing contents to a predesignated terminal number.

2. Description of the Related Art

Conventionally, in facsimile apparatus having an image signal storing function, when an image signal is received and stored therein during the absence of the user of the apparatus; the user can be notified of the storing of the image signal by one of two methods, i.e. by calling a beeper box that the user carries with him or her or by transmitting a voice signal to a telephone installed where the user is supposed to be visiting. There is also proposed an alternative method wherein the stored image signal itself is transferred to a facsimile apparatus designated as a transfer destination terminal.

Calling the beeper box or transmitting a voice signal to the designated telephone is no more than a method of just notifying the user of the fact that an image signal has been stored, and therefore, the user cannot get the details of the stored contents. As a result, the user may miss the right opportunity to take action in response to the stored image signal.

On the other hand, with the method wherein the stored image signal itself is transferred to the designated terminal, the problem is that there is a restriction to the selection of the destination terminal as the contents may include a confidential matter.

SUMMARY OF THE INVENTION

To overcome the above problems, it is an object of the invention to provide a facsimile apparatus that is capable of notifying the user of the details of image signal storing contents without restricting the selection of the destination terminal.

To accomplish the above object, the facsimile apparatus of the invention comprises: an image signal memory for storing image signals; a list text creation means for creating an image storing content list, a tabulated listing of the stored image signals; a transfer destination terminal number memory for storing image list transfer destination numbers, the terminal numbers to which the image storing content list is to be transferred; and a list text transfer means for transmitting the image storing content list to the image list transfer destination numbers stored in the transfer destination terminal number memory.

In one preferred mode of the invention, the facsimile apparatus further includes an automatic telephone answering means for storing voice signals, wherein: the list text creation means creates, besides the image storing content list, a voice storing content list, a tabulated listing of the stored voice signals; the transfer destination terminal number memory stores, besides the image list transfer destination number, voice list transfer destination numbers, the terminal numbers to which the voice list is to be transferred; and the list text transfer means operates to transmit the voice storing content list to the voice list transfer destination numbers as well as to transmit the image storing content list to the image list transfer destination numbers.

In another preferred mode of the invention, the facsimile apparatus further includes an image signal transmission setting means for performing the transmission of the image signals stored in the image signal memory, wherein: when the list text transfer means has completed the transmission of the image storing content list to the designated image list transfer destination number, a procedure interruption request is issued from a facsimile communication control means, and when a DTMF signal is received in response to the procedure interruption request, the image signal transmission setting means operates to transmit the image signal designated by the DTMF signal out of the image signals stored in the image signal memory.

Furthermore, the invention may be embodied in a facsimile apparatus wherein calling subscriber's terminal numbers, the facsimile terminal numbers from which facsimile transmission is expected, are stored in the transfer destination terminal number memory along with the image list transfer destination numbers corresponding to the calling subscriber's terminal numbers, the facsimile apparatus further including a number searching means for searching through the calling subscriber's terminal numbers stored in the transfer destination terminal number memory for a match with transmitting subscriber's terminal number, the transmitting subscriber's terminal number being the terminal number read by the facsimile communication control means as the facsimile terminal number from which the image signal stored in the image signal memory is transmitted, wherein: when the output of the number searching means signifies the existence of a match between the transmitting subscriber's terminal number and one of the remote terminal numbers stored in the transfer destination terminal number memory, the list text transfer means operates to transmit the image storing content list to the image list transfer destination number stored in correspondence with the calling subscriber's terminal number that matches the transmitting subscriber's terminal number.

According to the invention, the image signal means stores image signals, and the list text creation means creates an image storing content list, a tabulated listing of the stored image signals. The list text transfer means transmits the image storing content list created by the list text creation means to a designated image list transfer number stored in the transfer destination terminal number memory.

Furthermore, the list text transfer means transfers a voice storing content list, a tabulated listing of the voice signals stored in the automatic telephone answering means, to a designated voice list transfer destination number stored in the transfer destination terminal number memory, and the image storing content list, a tabulated listing of the image signals stored in the image signal memory, to a designated image list transfer destination number stored in the transfer destination terminal number memory.

At the completion of the image storing content list transmission to the designated image list transfer destination number, a procedure interruption request is issued from the facsimile communication control means. The image signal transmission setting means then transmits the image signal designated by the DTMF signal received in response to the procedure interruption request.

The number searching means examines if there is a match between the transmitting subscriber's terminal number, the facsimile terminal number from which the image signal is transmitted, and one of the calling subscriber's terminal numbers stored in the transfer destination terminal number memory. When a match is found, the list text transfer means operates to transmit the image storing content list to the image list transfer destination number corresponding to the calling subscriber's terminal number that matches the transmitting subscriber's terminal number.

As described, according to the construction of the facsimile apparatus of the invention, the image signal memory stores image signals and the list text creation means creates an image storing content list, a tabulated listing of the stored image signals, while the list text transfer means operates to transmit the image storing content list to the designated image list transfer destination number stored in the transfer destination terminal number memory. Therefore, the invention offers the advantage that the details of the image signal storing contents can be notified without restricting the selection of the destination terminal.

BRIEF DESCRIPTION OF THE DRAWINGS

Other and further objects, features, and advantages of the invention will be more explicit from the following detailed description taken with reference to the drawings wherein:

FIG. 2 is an explanatory diagram showing calling subscriber's terminal numbers and transfer destination terminal numbers stored in a transfer destination terminal number memory;

DETAILED DESCRIPTION OF THE PREFERRED EMBODIMENTS

Figure 1:
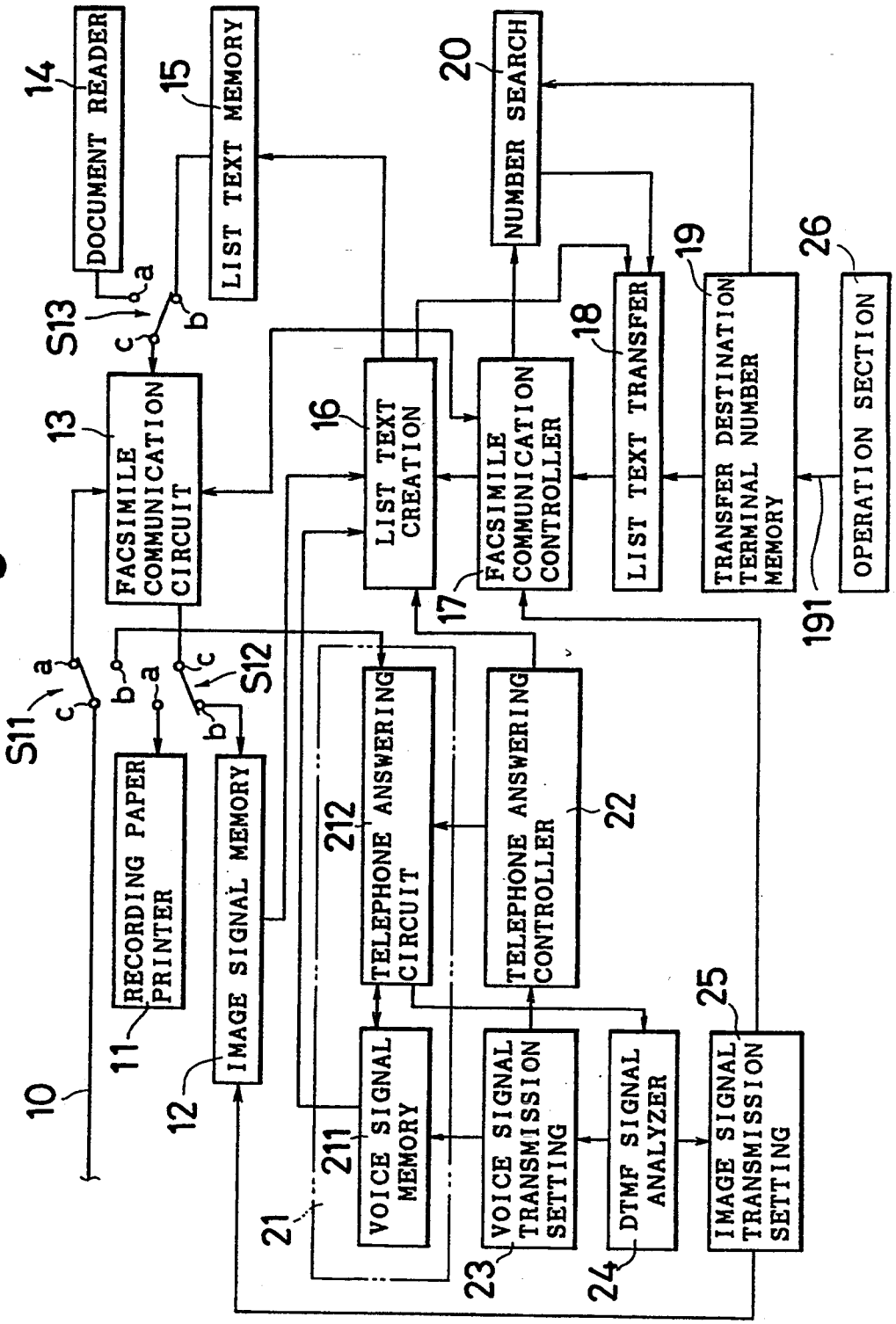
FIG. 1 is a block diagram showing the electrical configuration of one embodiment of the invention.

Now referring to the drawing, preferred embodiments of the invention are described below.

One embodiment of the invention will be described below with reference to the accompanying drawings.

FIG. 1 is a block diagram showing the electrical configuration of a facsimile apparatus in one embodiment of the invention.

As shown, a telephone line 10 is connected to one contact c of a switch S11, while another contact a of the switch S11 is connected to a facsimile communication circuit 13 which controls communications protocols for facsimile transmission and reception and which performs the compression/expansion, modulation/demodulation, etc. of image signal. The remaining contact b of the switch S11 is connected to an automatic telephone answering circuit 212 which controls operations such as transmission of a prerecorded message and recording of voice signals transmitted from the calling party.

Also connected to the facsimile communication circuit 13 are contacts c of a switch S12 and a switch S13, respectively. Another contact a of the switch S12 is connected to a recording paper printing section 11 which produces printed recording of received image signals on recording paper, whereas the remaining contact b of the switch S12 is connected to an image signal memory 12 which stores image signals in compressed form as transmitted from the facsimile communication circuit 13. At another contact a of the switch S13 is derived an output from a document reading section 14 which converts the document image into electrical signals. The remaining contact b of the switch S13 is connected to an output of a list text memory 15.

A facsimile communication control section 17, which sends out instructions for transmission and reception of image signals, is bidirectionally connected to the facsimile communication circuit 13. The facsimile communication control section 17 also supplies its outputs to a list text creation section 16 and a number searching section 20. Furthermore, the facsimile communication control section 17 is connected to the respective outputs of an image signal transmission setting section 25 and a list text transfer section 18.

The respective outputs of the list text creation section 18, the number searching section 20, and a transfer destination terminal number memory 19 are connected to the list text transfer section 18, while the output of the transfer destination terminal number memory 19 is also connected to the number searching section 20.

The image signal memory 12, a voice signal memory 211, and an automatic telephone answering control section 22 are respectively connected to the list text creation section 18 so that the respective outputs are supplied to the list text creation section 16. An output of the list text creation section 16 is connected to the list text memory 15. The voice signal memory 211 is bidirectionally connected to the automatic telephone answering circuit 212, while an output of the automatic telephone answering circuit 211 is connected to a DTMF (Dual Tone Multi Frequency) signal analyzing section 24. An output from the automatic telephone answering control section 22 is given to the automatic telephone answering circuit 212.

The DTMF signal analyzing section 24 supplies its outputs to a voice signal transmission setting section 23 as well as to the image signal transmission setting section 25. The outputs from the voice signal transmission setting section 23 and the image signal transmission setting section 25 are supplied to the voice signal memory 211 and the image signal memory 12, respectively.

In the above configuration, the voice signal memory 211 and the automatic telephone answering circuit 212 constitute an automatic telephone answering section 21.

The operation of the facsimile apparatus of the invention having the above described configuration will now be described in detail.

Data as shown in FIG. 2 is prestored in the transfer destination terminal number memory 19 via an output 191 from an operation section 26. The transfer destination terminal number memory 19 comprises a plurality of individual storage areas, each individual storage area consisting of a calling subscriber's terminal number area and a transfer destination terminal number area.

Of the prestored data, a transfer destination terminal number X1 stored in an individual storage area 30 is a transfer destination terminal number for both of an image storing content list and a voice storing content list (hereinafter described in detail), a transfer destination terminal number X2 stored in an individual storage area 31 is an image list/transfer destination terminal number for an image storing content list, and a transfer destination terminal number X3 stored in an individual storage area 32 is a voice list transfer destination terminal number for a voice storing content list.

Calling subscriber's terminal numbers, a1, a2, ..., an, are the facsimile terminal numbers of customers, associated companies, sales offices, etc. Each of these calling subscriber's terminal numbers, a1, a2, ..., an, is paired with an image list transfer destination number to which an image storing content list is to be transferred. As shown, the same terminal number A is assigned as the image list transfer destination number to the calling subscriber's terminal numbers a1, a2, ..., an. Likewise, for calling subscriber's terminal numbers b1, b2, ..., the same terminal number B is stored as an image list transfer destination number to be paired with each remote terminal number.

Other calling subscriber's terminal numbers and their corresponding image list transfer numbers are stored in the same manner as described above.

In the facsimile apparatus with the above data stored therein, the contact e of the switch S11 is normally connected to the contact b thereof so that the telephone line 10 is routed to the automatic telephone answering circuit 212. In this situation, a telephone conversation is conducted using a handset (not shown) which is a part of the automatic telephone answering circuit 212.

In normal facsimile communication mode, the contact c is connected to the contact a on each of the three switches S11, S12, and S13, so that an image signal read by the document reading section 14 is transmitted through the facsimile communication circuit 13 and on to the telephone line 10. On the other hand, an incoming image signal is transferred via the facsimile communication circuit 13 to the recording paper printing section 11 for printing on the recording paper. The above operation of the apparatus is the same as that of a conventional facsimile apparatus currently in use.

Figure 3:
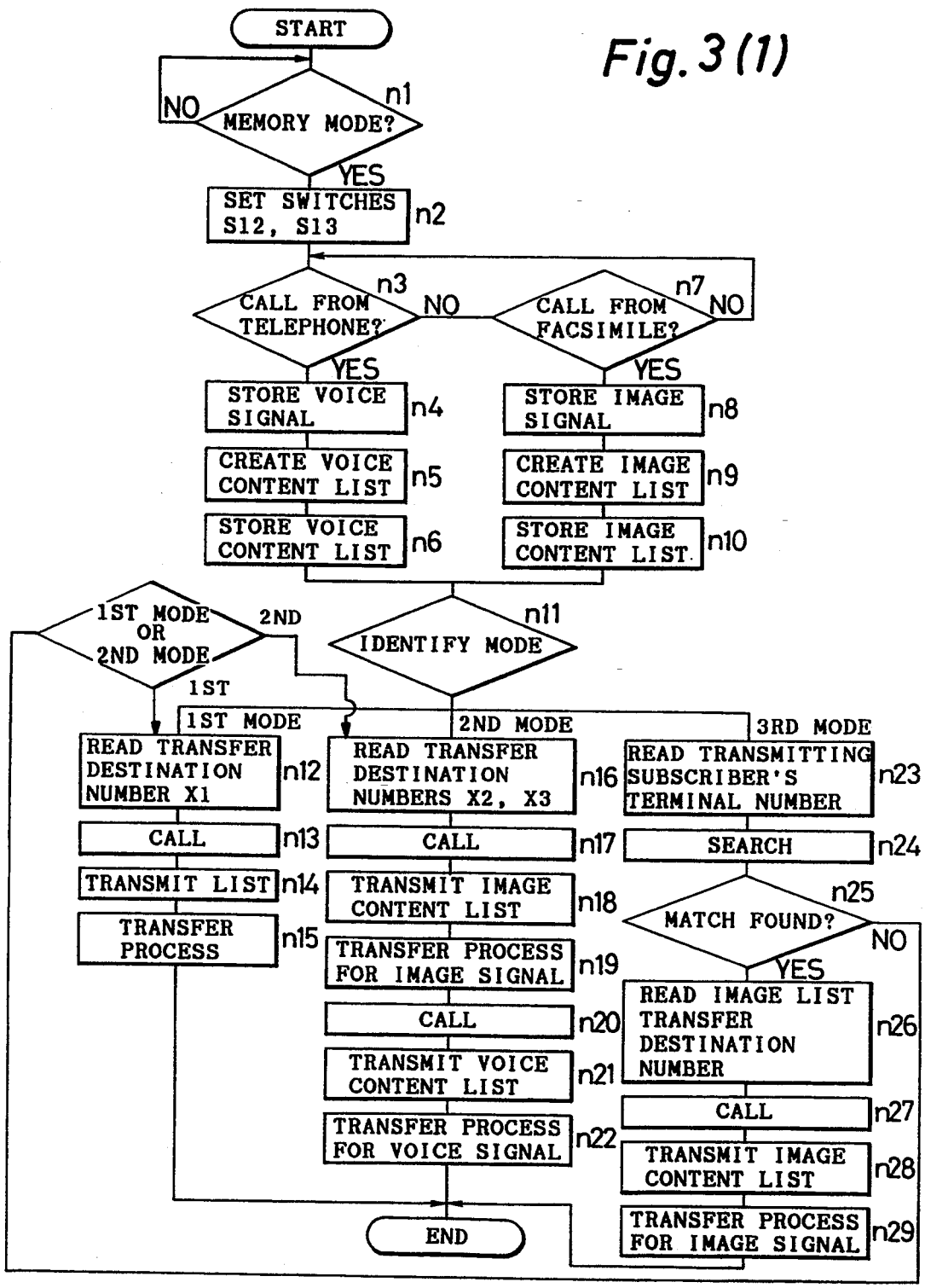
FIGS. 3(1) and 3(2) is a flow chart explaining the operation of the invention.
Figure 3:
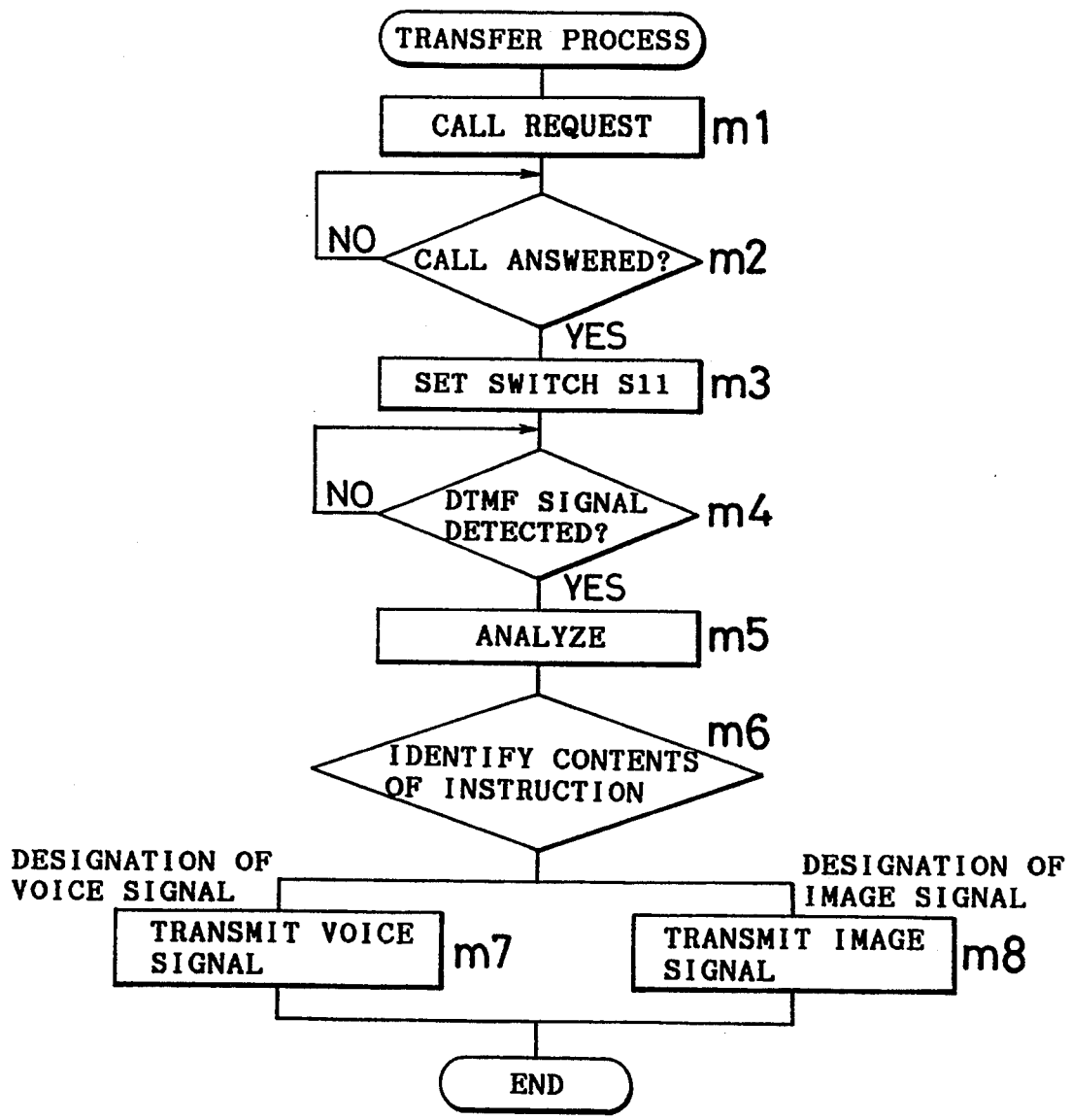

Referring now to FIG. 3, the operation of the apparatus is described below for storing a voice signal and an image signal.

Figure 4:
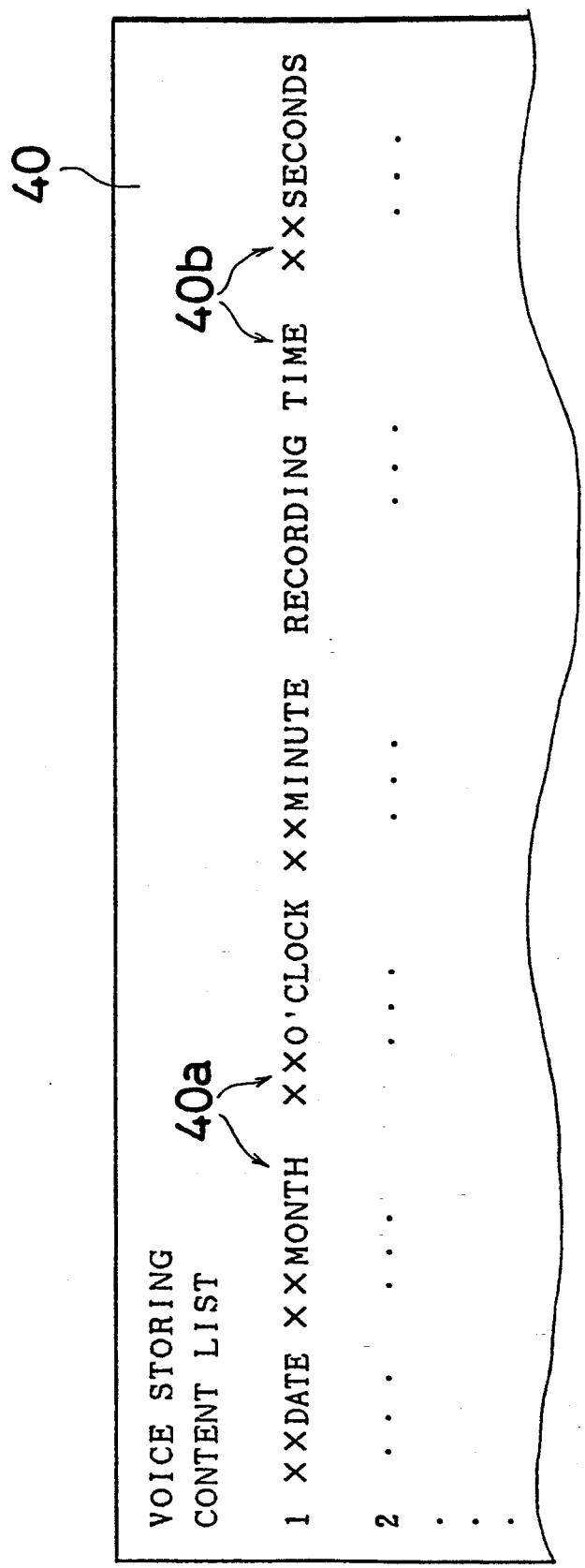
FIG. 4 is an explanatory diagram showing an image storing content list.

When the apparatus is set to memory mode using the operation section 26 in step n1, the contact c is connected to the contact b on each switches S12 and S13 in step n2. In this situation, when an incoming telephone call is received (step n3), a voice signal from the calling party is stored in the voice signal memory 211 via the switch S11 and the automatic telephone answering circuit 212 (step n4). The storing of the voice signal is notified to the list text creation section 16, which then creates a voice storing content list 40 in step n5, as shown in FIG. 4, showing the time and date 40a of the voice signal storing and the recording time 40b of the voice signal, and in step n6, delivers the thus created voice storing content list 40 to the list text memory 15 for storage therein.

Figure 5:
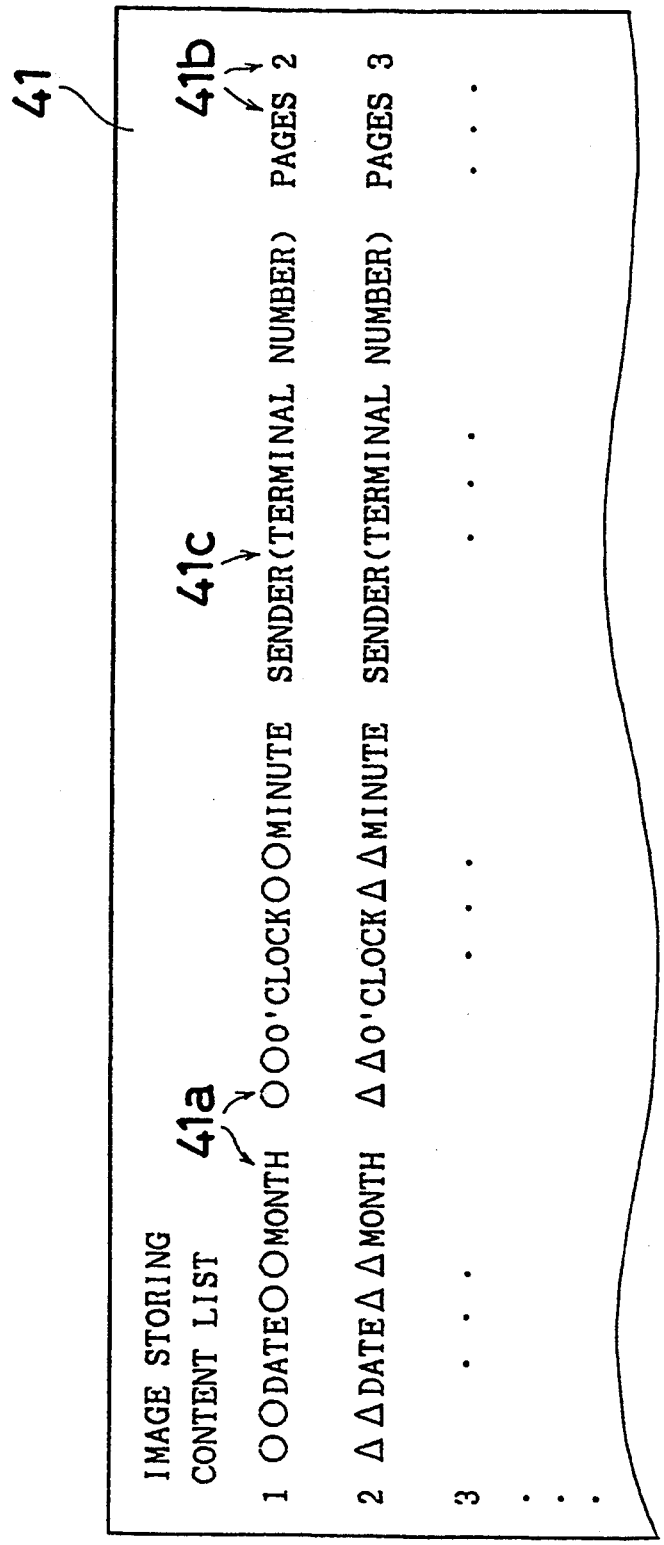
FIG. 5 is an explanatory diagram showing a voice storing content list.

On the other hand, when a call is received from a facsimile apparatus (step n7), an image signal from the calling party is transferred via the switch S11 and the facsimile communication circuit 13 to the image signal memory 12 for storage therein (step n8). The storing of the image signal is notified to the list text creation section 16, which then creates an image storing content list 41 in step n9, as shown in FIG. 5, showing the time and date 41a of the image signal storing and the total number 41b of pages of the document stored as well as the transmitting terminal number 41c derived through the facsimile communication circuit 13 and the facsimile communication control section 17, and in step n10, delivers the thus created image storing content list 41 to the list text memory 15 for storage therein.

When the image storing content list or the voice storing content list has been created by the list text creation section 16, the creation of the list is notified to the list text transfer section 18 where the kind of preset mode is identified (step n11). In a first mode in which all the lists (both the voice storing and the image storing content list) are to be transmitted to the same destination, the transfer destination terminal number X1 is read from the transfer destination terminal number memory 19 and given to the facsimile communication control section 17 (step n12). In a second mode in which the voice storing content list and the image storing content list are to be transmitted to different destinations, the list text transfer section 18 reads out of the transfer destination terminal number memory 19 the voice list transfer destination number X3 for transfer of the voice storing content list and the image list transfer destination number X2 for transfer of the image storing content list and gives these terminal numbers to the facsimile communication control section 17 (step n16). In response to the instruction from the facsimile communication control section 17, the facsimile communication circuit 13 is placed in transmission mode, the contact c is connected to the contact b on the switch S13, and a calling operation is performed (steps n13, n17, n20).

Thereafter, the voice storing content list and the image storing content list stored in the list text memory 15 are transferred via the switch S13 to the facsimile communication circuit 13 for transmission as a facsimile document to the designated destination(s) according to the preset mode. That is, in the first mode, both the image storing content list and the voice storing content list are transmitted to the transfer destination terminal number X (step n14), whereas in the second mode the image storing content list is transmitted to the image list transfer destination number X2 (step n18) and the voice storing content list is transmitted to the voice list transfer destination number X3 (step n21).

Figure 6:
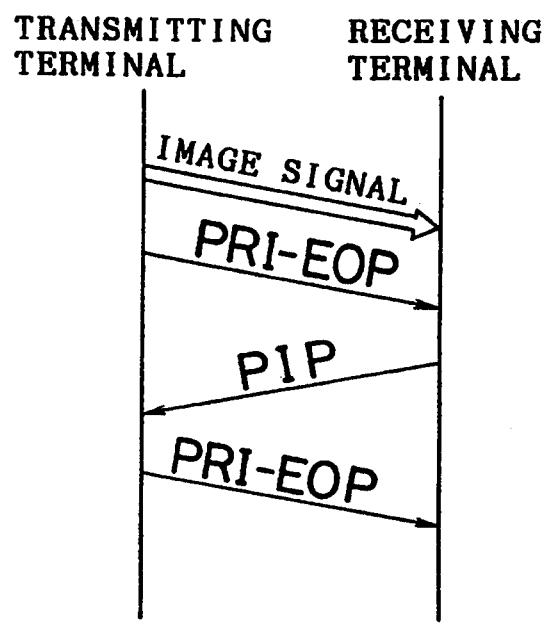
FIG. 6 is an explanatory diagram showing an example of a procedure interruption request specified in CCITT recommendation T.30.

In the last step of the above process for transmission of the lists, a transfer process as shown in FIG. 3(2) is initiated. In step m1, on the basis of the instructions from the list text transfer section 18, the facsimile communication control section 17 sends out a call request that is prescribed as a procedure interruption request in CCITT (Consultative Committee of International Telegraph and Telephone) recommendation T.30 (an example of the procedure is shown in FIG. 6), to call an operator at the designated destination facsimile apparatus to which the lists have been transferred. For calling, a PRI-EOP signal (Procedure Interrupt-End of Procedure signal) is used, in response to which a PIP signal (Procedure Interrupt Positive signal) is sent back from the destination apparatus.

When the call is answered by an operator at the destination facsimile apparatus (step m2), the contact c is connected to the contact b on the switch S11 (step m3). By making reference to the already transferred list or lists (either the voice storing content list or the image storing contact list or both), the called operator transmits a DTMF signal, using a DTMF signal generating apparatus the operator carries with him or her, to designate the stored contents (from the voice signals stored in the voice signal memory 211 or the image signals stored in the image signal memory 12) that the operator wants to be transferred.

When the DTMF signal is detected, the DTMF signal is delivered through the switch S11 and through the automatic telephone answering circuit, 212, which is under control of the automatic telephone answering control section 22, on to the DTMF signal analyzing section 24 (step m4). The DTMF signal analyzing section 24 then analyzes the thus delivered DTMF signal to read the contents thereof (step m5), the instruction thereof then being given to the voice signal transmission setting section 23 when the designated contents relates to the contents of the voice storing content list, and to the image signal transmission setting section 25 when they relates to the contents of the image storing content list (step m6).

In the case of the transmission of a voice signal stored in the voice signal memory 211 (step m7), the voice signal transmission setting section 23 directs the voice signal memory 211 to output the designated voice signal and operates the automatic telephone answering circuit 212 through the automatic telephone answering control section 22 to transmit the designated voice signal over the telephone line 10. On the other hand, in the case of the transmission of an image signal stored in the image signal memory 12 (step m8), the image signal transmission setting section 25 directs the image signal memory 12 to output the designated image signal and operates the facsimile communication circuit 13 through the facsimile communication control section 17 to transmit the designated image signal over the telephone line 10.

When the facsimile apparatus is set in a third mode (step n23), the transmitting facsimile terminal number read by the facsimile communication control section 17 during the storing of the image signal in the image signal memory 12 is given as the transmitting subscriber's terminal number to the number searching section 20. In step n24, the number searching section 20 compares the transmitting subscriber's terminal number with the calling subscriber's terminal numbers stored in the transfer destination terminal number memory 19, to examine if there is a match with any one of the calling subscriber's terminal numbers stored in the transfer destination terminal number memory 19 (step n25). In case a match is found, the image list transfer destination number corresponding to the matching calling subscriber's terminal number is given to the list text transfer section 18. Otherwise, processing continues at block n30 whereat it is determined whether the first mode or the second mode should be executed.

In response, the list text transfer section 18 transmits the image storing content list to the designated destination in the same manner as previously described, the designated destination being indicated by the transfer destination number received from the number search section 20 (steps n27, n28). That is, when the calling subscriber's terminal number is one of a1, a2, a3, etc., the image storing content list is transmitted to the image list transfer destination number A, and when the calling subscriber's terminal number is one of b1, etc., the image storing content list is transmitted to the image list transfer destination number B. Thereafter, in step n29, the transfer process as described above is initiated.

As described, in the present embodiment, when the apparatus is set in the second mode, the voice storing content list and the image storing content list can be transferred to different destinations, so that the voice storing or the image storing content list, whichever necessary, can be received at the respective destinations.

Furthermore, since the apparatus is made ready to accept a DTMF signal when a procedure interruption request is made, the voice or image signal desired for transmission can be designated from the destination terminal so that only the necessary voice or image signal can be transferred to the destination terminal. This feature serves to better protect the secrecy.

Also, when the apparatus is set in the third mode, the destination terminal to which the list of stored image signals is to be transferred is automatically designated, thereby preventing unnecessary information from being transmitted to external terminals.

The above description has dealt with the embodiment in which the calling subscriber's terminal numbers and image list transfer destination numbers stored in the transfer destination terminal number memory 19 are paired with each other, but it will be appreciated that the invention is not limited to the paired method described in the above embodiment. Alternatively, such a method may be employed in which, under one image list transfer destination number, calling subscriber's terminal numbers which require a transfer to this image list transfer destination number are successively stored.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A facsimile apparatus comprising:
   an image signal memory for storing image signals;
   an automatic telephone answering means for storing voice signals;
   a list creation means for creating:
     a list of stored image signals;
     a list of stored voice signals;
   a transfer destination terminal number memory for storing:
     at least one transfer destination terminal number to which the list of the stored image signals is to be transferred;
     at least one transfer destination terminal number to which the list of stored voice signals is to be transferred; and
   a list transfer means for transmitting:
     the list of stored image signals to a terminal having its terminal number stored in the transfer destination terminal number memory;
     the list of stored voice signals to a terminal having its terminal number stored in the transfer destination terminal number memory;
   an image signal transmission setting means for performing a transmission of the image signals stored in the image signal memory;
   a facsimile communication control means which issues procedure interruption request when the list transfer means has completed the transmission of the list of stored image signals to a designated image list transfer destination terminal number; and
   wherein when a DTMF signal is received in response to the procedure interruption request, the image signal transmission setting means operates to transmit a designated image signal designated by the DTMF signal out of the image signals stored in the image signal memory.

2. A facsimile apparatus comprising:
an image signal memory for storing image signals;
an automatic telephone answering means for storing voice signals;
a list creation means for creating:
 a list of stored image signals;
 a list of stored voice signals;
a transfer destination terminal number memory for storing:
 at least one transfer destination terminal number to which the list of the stored image signals is to be transferred;
 at least one transfer destination terminal number to which the list of stored voice signals is to be transferred; and
a list transfer means for transmitting:
 the list of stored image signals to a terminal having its terminal number stored in the transfer destination terminal number memory;
 the list of stored voice signals to a terminal having its terminal number stored in the transfer destination terminal number memory;
wherein a plurality of calling subscriber's terminal numbers are stored in the transfer destination terminal number memory along with, for each subscriber, a transfer destination terminal number to which the list of the Stored image signals is to be transferred,
a facsimile communication control means and a number searching means for searching through the plurality of calling subscriber's terminal numbers stored in the transfer destination terminal number memory for a match with a transmitting subscriber's terminal number, the transmitting subscriber's terminal number being read by the facsimile communication control means as a facsimile terminal number from which an image signal stored in the image signal memory is transmitted, wherein:
when the output of the number searching means signifies the existence of a match between the transmitting subscriber's terminal number and one of the calling subscriber's terminal numbers stored in the transfer destination terminal number memory, the list transfer means operates to transmit the list of stored image signals to a terminal having the transfer destination terminal number stored in correspondence with the calling subscriber's terminal number that matches the transmitting subscriber's terminal number.

3. A facsimile apparatus comprising:
an image signal memory for storing image signals;
an automatic telephone answering means for storing voice signals;
a list creation means for creating:
 a list of stored image signals;
 a list of stored voice signals;
a transfer destination terminal number memory for storing:
 at least one transfer destination terminal number to which the list of the stored image signals is to be transferred;
 at least one transfer destination terminal number to which the list of stored voice signals is to be transferred; and
a list transfer means for transmitting:
 the list of stored image signals to a terminal having its terminal number stored in the transfer destination terminal number memory;
 the list of stored voice signals to a terminal having its terminal number stored in the transfer destination terminal number memory;
wherein the list transfer means transmits both the list of stored image signals and the list of stored voice signals to a same transfer destination terminal.

4. A facsimile apparatus comprising:
an image signal memory for storing image signals;
an automatic telephone answering means for storing voice signals;
a list creation means for creating:
 a list of stored image signals;
 a list of stored voice signals;
a transfer destination terminal number memory for storing:
 at least one transfer destination terminal number to which the list of the stored image signals is to be transferred;
 at least one transfer destination terminal number to which the list of stored voice signals is to be transferred; and
a list transfer means for transmitting:
 the list of Stored image signals to a terminal having its terminal number stored in the transfer destination terminal number memory;
 the list of stored voice signals to a terminal having its terminal number stored in the transfer destination terminal number memory;
wherein the list text transfer means transmits the list of stored image signals and the list of stored voice signals to differing transfer destination terminals.

5. A facsimile apparatus comprising:
an image signal memory for storing image signals;
an automatic telephone answering means for storing voice signals;
a list creation means for creating:
 a list of stored image signals;
 a list of stored voice signals;
a transfer destination terminal number memory for storing:
 at least one transfer destination terminal number to which the list of the stored image signals is to be transferred;
 at least one transfer destination terminal number to which the list of stored voice signals is to be transferred; and
a list transfer means for transmitting:
 the list of stored image signals to a terminal having its terminal number stored in the transfer destination terminal number memory;
 the list of stored voice signals to a terminal having its terminal number stored in the transfer destination terminal number memory;
wherein the transfer destination terminal number to which a list is transmitted is dependent upon an origination terminal number which initiated communication with the facsimile apparatus.

6. A facsimile apparatus comprising:
an image signal memory for storing image signals;
an automatic telephone answering means for storing voice signals;
a list creation means for creating:
 a list of stored image signals;
 a list of stored voice signals;

a transfer destination terminal number memory for storing:

at least one transfer destination terminal number to which the list of the stored image signals is to be transferred;

at least one transfer destination terminal number to which the list of stored voice signals is to be transferred; and a list transfer means for transmitting:

the list of stored image signals to a terminal having its terminal number stored in the transfer destination terminal number memory;

the list of stored voice signals to a terminal having its terminal number stored in the transfer destination terminal number memory;

communication selection response means which, subsequent to transmission of a list to a transfer destination terminal, responds to a request from the transfer destination terminal for transmitting a selected stored signal to the transfer destination terminal.

* * * * *